April 8, 1947.  R. COMTOIS  2,418,546
SPREADING MACHINE
Filed March 16, 1943
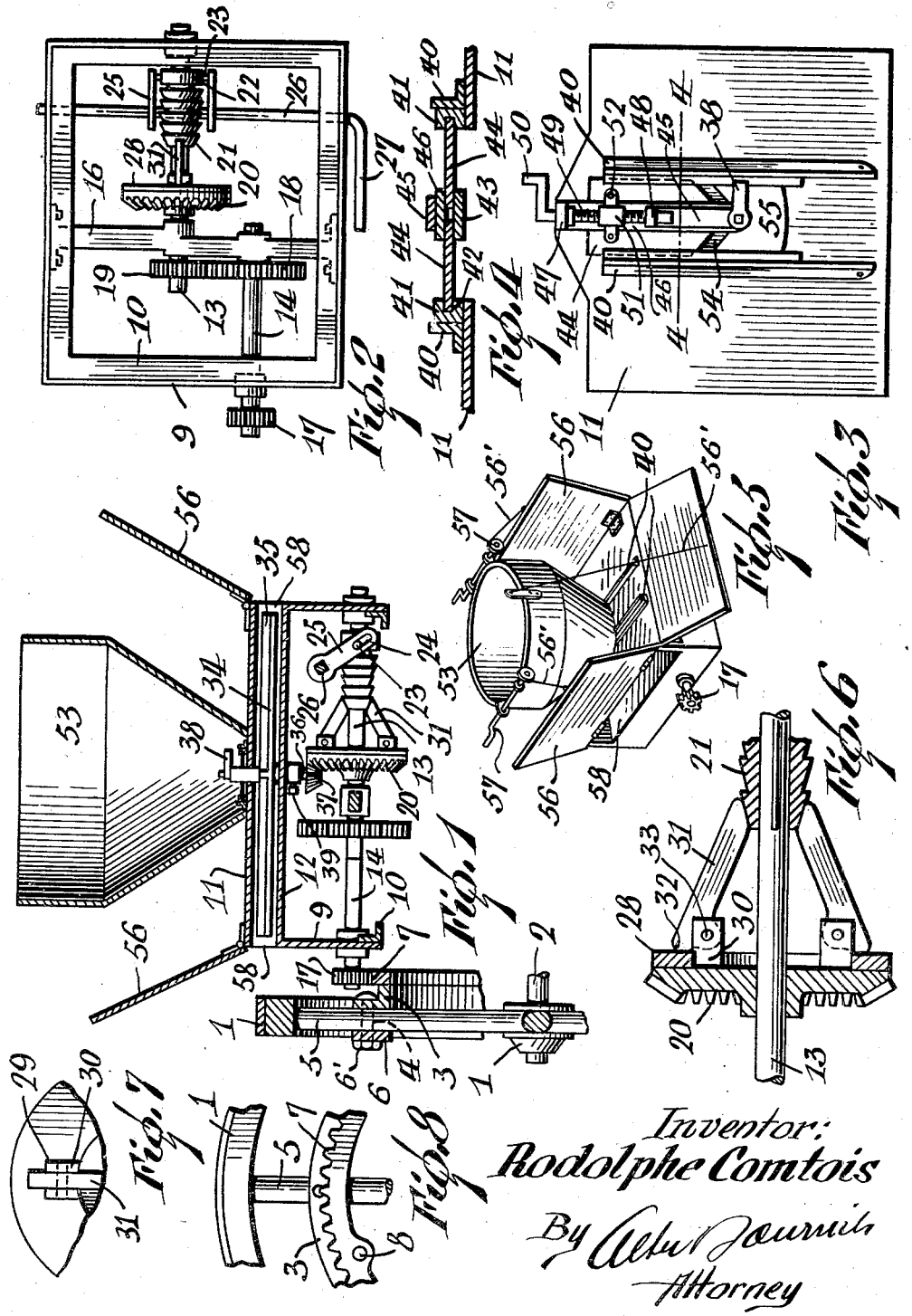
Inventor:
Rodolphe Comtois
By Albur Journier
Attorney Patented Apr. 8, 1947

2,418,546

UNITED STATES PATENT OFFICE 2,418,546

SPREADING MACHINE

Rodolphe Comtois, Saint Hyacinthe, Quebec, Canada

Application March 16, 1943, Serial No. 479,346
In Canada March 16, 1942

1 Claim. (Cl. 275—8)

The present invention pertains to a novel mechanism for distributing various materials by centrifugal force, such as fertilizer, insecticides of various kinds, and sand or salt for icy surfaces.

The principal object of the invention is to provide a device of this character wherein the discharging mechanism is frictionally driven from the transmission of the vehicle and controlled from a single handle or crank.

Another object is to provide external means for governing the direction of the controlled material accurately and at will. These objects are accomplished by comparatively simple and inexpensive means.

The apparatus includes a wheeled vehicle carrying a funnel or hopper for the load. The contents of the funnel is agitated and thrown out by a mechanism driven from one of the wheels of the vehicle. The drive gearing includes a novel friction clutch operable by hand to operate the mechanism or leave it idle, as desired.

The invention is fully disclosed by way of example in the following description and in the accompanying drawings in which:

Figure 1 is a vertical section of the device applied to the wheel of a vehicle;

Figure 2 is a bottom view;

Figure 3 is a plan view, with the funnel removed;

Figure 4 is a vertical section on the line 4—4 of Figure 3;

Figure 5 is a perspective view;

Figure 6 is a section of the brake;

Figure 7 is a fragmentary elevation of the brake, at right angles to Figure 6, and Figure 8 is a fragmentary view of the wheel fitted with a crown gear.

Reference to these views will now be made by use of like characters which are employed to designate corresponding parts throughout.

The numeral 1 designates the wheel of a vehicle mounted on an axle 2. Fixed on the wheel is a ring 3 of angle cross section held by bolts 4 entering the spokes 5 of the wheel. The ring is mounted at the inner side of the wheel, and at the other side is mounted another metal ring 6 also held by the bolts 4 and nuts 6' in order to strengthen the assembly, for a purpose presently to be described, particularly since the spokes are of wood and the rings of metal. Not all the spokes are pierced by bolts 4.

To the member 3 is attached by bolts 8 a ring gear 7 forming with this member a crown gear, or the members 3 and 7 may be integral with each other, although the shown construction is preferred. On the vehicle (not shown) is mounted a frame 9 having its lower end fixed to a square frame 10 formed of angle bars. The frame 9 has an open bottom, and at the top are two plates 11 and 12 spaced vertically a short distance apart. As clearly shown in Figure 2 the frame 9 supports two transverse shafts 13 and 14 parallel to each other. The shafts terminate within the frame 9, having their inner ends journalled in a crossbar 16 and being further supported in opposite sides of the frame.

One of the shafts, for example the shaft 14, is extended exteriorly to receive a pinion 17 meshing with the gear 7. The shaft 14 carries a gear 18 which meshes with a similar gear 19 on the shaft 13. The latter also carries a bevel gear 20 and a sleeve 21 having several conical faces. The sleeve 21 carries collar 22 adapted to slide the sleeve on the shaft 13 on which it is keyed. Pins 23 fixed on the collar are received loosely in slots 24 formed in a yoke 25 pivotally mounted at 26 through an operating crank 27.

A flat ring 28 is placed next to the bevel gear 20 and is held in place by two internal and opposed grooves 29 receiving corresponding ears 30 integral with the gear 20. Between the ears is pivoted an end of an arm 31 rounded at 32 and engaging the ring 28. The arms are attached to the ears by pivot pins 33. The other end of each arm is cut oblique and rests on the sleeve 21 at one of the conical faces.

Between the plates 11 and 12 is provided another plate 34 provided on its upper surface with radial fins 35. The plate 34 has a rod 36 extending downwardly and to which is fixed a pinion 37 meshing with the bevel gear 20. The upwardly extending portion of the rod carries a crank 38. Between the pinion 37 and the plate 12, the axle carries a lubricant fitting 39.

Two parallel angle irons 40 are fixed upon the plate 11 at equal distance from the axle 36. As shown in Figure 4, a channel bar 41 is secured to each member 40, the grooves 42 thereof facing each other to form a guide track. Between the bars 41 is a flat strip 43 and the plate 11 is relieved between the channels to permit flow of material. Plates 44 are slidably received in the channels, abutting over the strip 43. The joint is covered by two superimposed strips 45 and 46 extending from the axle 36, the lower strip 46 terminating at an edge of the frame 9 where it has a lug 47. The other strip 45 terminates in a similar lug 48 at approximately the midpoint of strip 46. The lugs receive a screw shaft 49 which extends outside of the box and is provided with a crank 50.

The screw shaft 49 carries a loose strap 51 having opposed lugs 52 secured to the plates 44. A funnel 53 for containing the load is mounted on the plate 11, and consequently the displacement of the plates 44 varies the size of the discharge opening 54. The latter is V shaped due to the oblique ends of the plates 44 which abut against a notched plate 55 secured in the channels 42.

To the edges of the plate 11 are hinged side boards 56 connected by cables 56' to cranks 57 on the funnel 53, for adjusting the angle thereof.

In a simpler construction, the axle 2 may be continuous with the shaft 13 and the latter further extended to eliminate the shaft 14. If it is desired to regulate the opening 54 still further, another plate (not shown) may be slidably mounted beneath the plates 44 and the strip 43.

In the operation of the device rotation of the wheel 1 and ring gear 7 drives the pinion 17 and shaft 14. Gears 18 and 19 drive the shaft 13 and sleeve 21, but the collar 22 does not rotate. When the sleeve is shifted towards the gear 20, the free ends of the arms 31 are spread apart, swinging the arms on their pivots 32 and causing the rounded cam ends 32 to be tightened against the ring 28. The gear 20 is thus brought into driving relation with the sleeve 21 and shaft 13 and, meshing with the pinion 37, rotates the rod 36 of the plate 34. The contents of the funnel 53 are agitated at 38 and flow through the adjustable outlet 54 upon the plate 34 to be thrown centrifugally by the blades 35 through the lateral spaces 58 above the frame 9. The width or angle of the stream is regulated by the lateral side boards 56. The rear board 56 projects a downward stream as in Figure 5.

The successive conical faces of the sleeve 21 come into use as the preceding faces become worn. The boards 56 may be replaced, if desired, by tubes for directing the streams of material.

Although a specific embodiment of the invention has been illustrated and described, it will be understood that various alterations in the details of construction may be made without departing from the scope of the invention as indicated by the appended claim.

What I claim as my invention is:

A spreader of the character described comprising a wheeled vehicle having a frame, said frame having two spaced horizontal plates, throwing means disposed between said plates, a funnel on the upper plate, said upper plate having an opening connecting said funnel to said throwing means, boards hinged to the lateral and rear edges of said plates and coextensive with said edges, cranks mounted on said funnel adjacent to the boards hinged to said lateral edges, and cables extending from the last named boards and adapted to be wound respectively on said cranks.

RODOLPHE COMTOIS.

REFERENCES CITED

The following references are of record in the file of this patent:

UNITED STATES PATENTS

| Number | Name | Date |
| --- | --- | --- |
| 122,405 | Price et al. | Jan. 2, 1872 |
| 2,081,661 | Dodge | May 25, 1937 |
| 772,229 | Fairly | Oct. 11, 1904 |
| 839,394 | Klein | Dec. 25, 1906 |

FOREIGN PATENTS

| Number | Country | Date |
| --- | --- | --- |
| 1,495/26 | Australia | May 3, 1927 |
| 180,493 | British | June 1, 1922 |